(No Model.)
F. LUGRIN & E. DU ROVERAY.
METHOD OF PRODUCING FOOD FOR FISH.
No. 405,713. Patented June 25, 1889.
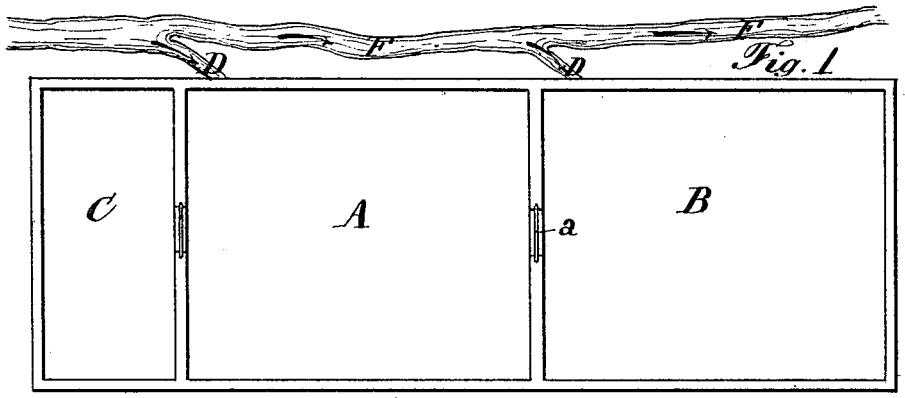
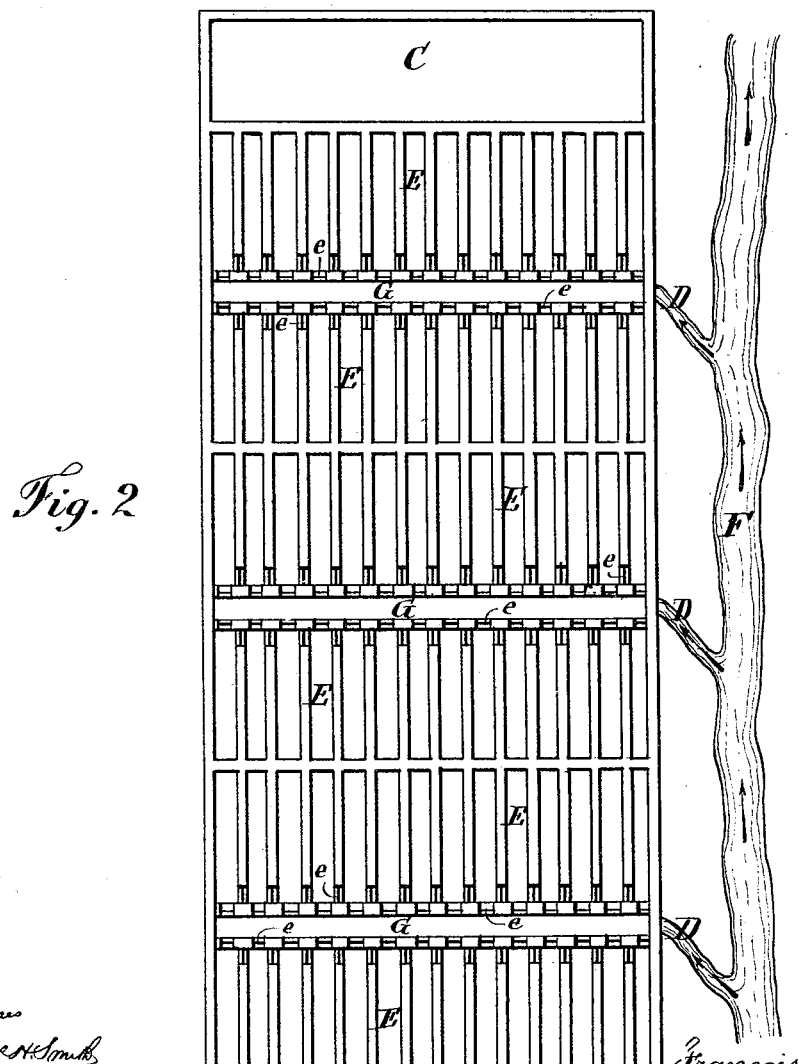

UNITED STATES PATENT OFFICE.

FRANÇOIS LUGRIN AND EDOUARD DU ROVERAY, OF GENEVA, SWITZERLAND.

METHOD OF PRODUCING FOOD FOR FISH.

SPECIFICATION forming part of Letters Patent No. 405,713, dated June 25, 1889.

Application filed February 10, 1888. Serial No. 263,614. (No model.) Patented in France November 7, 1887, No. 184,469.

*To all whom it may concern:*

Be it known that we, FRANÇOIS LUGRIN and EDOUARD DU ROVERAY, both of the city of Geneva, Switzerland, have invented a certain new and useful Improved Method or Process of Producing and Supplying Food for Fish and Apparatus therefor; and we do hereby declare that the following is a full, clear, and exact description of the same.

The said invention relates to processes or methods of producing and supplying food for fish and apparatus to carry the same into effect, and it is designed to promote the feeding and production of fish in a more economical, effective, and practical manner than has been hitherto possible.

It consists of new processes or methods allowing the production and obtainance within a limited space of all the necessary natural conditions required for feeding and producing to any extent insect-food adapted to all sorts of fish in the cheapest way.

The principal difficulties of rearing fish on a large scale—such as that to which our process is adapted—are, first, to supply the fish with suitable nourishment, and, secondly, maintaining the water in a healthy state while the nourishment of the fish is held in it. Our processes or methods deal with both these essential points.

We have remarked in studying the conditions of existence of fish and by examining the contents of their stomachs that the food which they appear to require most is largely composed of small crustaceans, (especially for trout and other similar fish, those known as *Daphnia pulex* and other species,) and we have devoted ourselves to learning the particular conditions of the existence of the crustaceans. We have, after numerous and persevering experiments, arrived at such knowledge as to enable us to multiply the *Daphniæ* and other animalculæ under the conditions which are necessary for them, and so obtain the multiplication of this living food which is so natural and favorable to fry and fish. The means are furnished to us by the fish themselves, inasmuch as we have discovered that the *Daphniæ* or other animalculæ reproduce and develop themselves to an enormous extent among the excrement of fish. It is only necessary in order to obtain a sufficient quantity of food to allow a certain number of fish to remain for a time in a suitable tank to deposit their excrement there, but a special method facilitating the development of the animalculæ and their reproduction must always be used. This being a principle or essential part of our invention, our process or special method is to move periodically either the fish or the water contained in two corresponding tanks, the one of which contains the fish, while the food is produced in the other one, and vice versa. We will first explain the movement of the fish, being the most convenient practical part of our process.

We employ for the periodical movement of the fish pools constructed in pairs, allowing the fish to be transferred from one pool to another, according to the nutritive state of the water, by means of suitable sluices and gates, the pool being made of such form and so provided with such external means of access as to easily enable the fish to be moved from pool to pool.

We first place a certain number of fish, varying according to the size of the fish or pool, in a pool which contains the food necessary for their existence. While assimilating this food the fish deposit their excrement in the pool. This excrement descends to the bottom of the pool, where it decomposes, and it is this decomposition which induces the development of the animalculæ which constitute the food of the fish. The pool contains, besides, a certain quantity of naïs, (Lin.,) certain larvæ of insects, water slugs or snails, and crustaceans—such as prawns, &c.—which also feed upon the excrement of the fish, and which clean the pool from aquatic vegetation and stop its growth, as such vegetation would injure the generation and existence of the animalculæ. In order not to injure the reproduction of these animalculæ, a certain proportion in the number of water-slugs and crustaceans left in the pool must be kept up. This proportion varies according to the quality of the water and the size of the pools. The prawns and water-slugs become in their turn, with the animalculæ—such as *Daphniæ*, &c.— food for the fish. The pools in which the reproduction of insect-food takes place ought to be covered, the said reproduction being accelerated by the darkness. A stream of pure water ought to be continually flowing through the tank, in order to keep the water sweet and prevent its becoming decomposed. When the water of this first pool is sufficiently charged with excrement, the fish are caused to pass into the second pool, in order that the production of the animalculæ in the first pool may proceed with activity. After about a month, or less, from the time of this transfer the first pool is abundantly provided with living food, and is ready to have again the fish retransferred to it. The fish then return to it, and the generation of the living food commences and proceeds in the second pool, which has just been left charged with excrement. About a month afterward the transfer is repeated, and the fish are then moved from time to time to a fresh supply of food and grow in a most remarkable manner.

It is evident that in the first instance the pools must be furnished with a sufficient quantity of the animalculæ to support the life of the fish, but that afterward, by reason of the process described above, all the necessary nourishment reproduces itself. We will now explain that the process can be equally carried out by an alternate change of the water in the pools, according to its nutritive state or condition. The water charged with excrement could be diverted into another pool, and the reproduction of the animalculæ and the crustaceans would then proceed perfectly. This water, when charged with food and clear of all hurtful germs, would be caused to return to the pool containing the fish. It will be necessary always to have a constant and sufficient supply of pure water running into and through all the pools used.

It is to be remarked that the excrement of fish is not the only one which possesses the property of nourishing the animalculæ necessary for their food, but that many other excrements equally possess this property.

The crustaceans or prawns and water-slugs serve to destroy all germs or aquatic vegetation injurious to the reproduction and life of the animalculæ.

We claim our above-described process to be equally applicable to salt-water fish and fresh-water fish.

For the practical carrying out of the process it is important to have a system of combined pairs of pools; but the shape of the pools is immaterial.

In order that our invention may be the better understood, we now proceed to describe the same with reference to the accompanying drawings, in consideration of which it must be understood that we reserve the right to vary the form of all details of construction as circumstances may suggest.

Figure 1 represents a pair of pools combined with their accessories. This is the simplest means of carrying our process into effect, and which requires the least space and work. Fig. 2 represents a plan of a series of pools combined in pairs with accessories suitable for a large establishment.

In Fig. 1, A and B are the two pools employed alternately for the rearing of the fish and the generation of the animalculæ. They communicate by a sluice or passage $a$, by which the fish can be conducted from one to the other alternately, as the process requires. C is an additional pool where the animalculæ are first placed, in order to commence the process, and which acts as a relay. The canals D are in communication with flowing water, and are constantly keeping up a supply of pure water to the pools.

In Fig. 2, C is a commencing-pool, in which water charged with excrement is placed, and into which the first animalculæ are put, constituting a commencing-pool for the process and a reserve of nourishment. E E are a series of pools communicating with C by means of suitable piping or canals, so as to receive, in case of need or as supplement, a supply of food. The pools are fed with pure water by a system of canals D in communication with any suitable water-supply F, such as a running stream. All these pools communicate between themselves, as well as with a central canal G, by means of valves or sluices $e$. Thus the fish can be passed from one half series to the other, and the operation is effected in each half-series, as in the case of a single pool at Fig. 1. As soon as the water in one half-series is sufficiently charged with excrement the fish are transferred into the neighboring half-series, and during their abode in this half-series the generation of the animalculæ is effected in the other, and so on. The advantage of dividing into small pools is the fact that the fish can thus be more easily sorted out according to their size, thus protecting the smaller from the voracity of the larger. Pure water is constantly supplied by means of the system of canals, and the water in the tank is maintained at the desired level by means of suitable cocks. Overflow-canals are provided to carry off overflow water.

Without modifying in principle the method already described for obtaining the development of the animalculæ which form the nourishment of the fish we may modify the process so as to arrive at the same result in less time.

In place of leaving the animalculæ to reproduce and develop themselves during a month, as before specified, we can arrive at the same result in twelve to fifteen days by means of the following process: We collect the excrement from the bottoms of the pools or basins and boil it for about a quarter of an hour. We throw the material thus treated into the pool where the living nourishment is to be produced.

It is to be understood that in starting this system of supplying fish with food the fish during their sojourn for the first time in the first tank or pool have to be supplied with food, and also during the sojourn for the first time in the second tank, but that upon their return to the first tank from the second the fish receive no other food than the animalculæ which have developed in said first tank while the fish were in the second tank, and also that which may develop while they are in said first tank for the second time, and in like manner the fish when returned to the second tank for the second time receive no other food than the animalculæ which have developed while the fish were in the first tank for the second time, and also that which may develop while the fish are in said second tank for the second time. Thus after the system is once started no food is supplied to the fish except that which is developed from the excrement, as before explained, and this excrement, which we utilize to derive food from for the fish, is usually removed from fish-pools by other pisciculturists as being matter that must not be allowed to remain in the pools or tanks.

Having now particularly described and specified the nature of our said invention, and in what manner the same is to be practiced, we declare that what we claim is—

1. The method herein described of developing food for fish and feeding the same, consisting in providing two or more ponds, passing the fish from the first pond to the second, allowing the excrement to remain and develop animalculæ, and returning the fish to the first pond to feed on the animalculæ while the animalculæ are developed in the second pond, and then repeating the operation, substantially as specified.

2. The method herein specified of developing food for fish and feeding and caring for such fish, consisting in separating the fish into groups according to their approximate size and keeping the same in sets of small communicating ponds or pools, passing the fish periodically from one set of pools to another and allowing the empty set of pools to remain for the development of animalculæ from the excrement contained therein, and feeding the fishes thereon in one set of pools while the animalculæ are developed in the other set of pools, substantially as specified.

3. The method herein described of developing food for fish and feeding the same, consisting in providing two or more tanks or ponds, passing the fish from the first to the second, removing the excrement from the first tank, heating said excrement to promote decomposition and returning it to the first tank, darkening the tank and allowing the excrement to remain and develop animalculæ, returning the fish to said first tank to feed on the animalculæ, then treating the excrement of the second tank, as described, with reference to the first tank, and then returning the fish to feed on the animalculæ developed in the second tank, substantially as specified.

FRANÇOIS LUGRIN.
EDOUARD DU ROVERAY.

Witnesses:
ELMER SCHNEIDER,
HENRI WYSS.